United States Patent Office.

NATHANIEL B. RICE, OF EAST SAGINAW, MICHIGAN.

Letters Patent No. 110,680, dated January 3, 1871.

IMPROVEMENT IN THE MANUFACTURE OF ACID PHOSPHATES FOR USE IN BAKING-POWDERS, &C.

The Schedule referred to in these Letters Patent and making part of the same.

*To all whom it may concern:*

Be it known that I, NATHANIEL B. RICE, of the city of East Saginaw, county of Saginaw, and State of Michigan, have invented new and improved Acid Compounds to be used with carbonated alkalies for baking and cooking purposes and for other uses, also a new mode of treating insoluble phosphates or substances containing it; and I do hereby declare that the following is a full, clear, and exact statement of one of the modes of making and preparing for use.

I take one thousand pounds of pulverized or comminuted phosphate of lime, as contained in apatite or bone, placed in a convenient agitator, to which I add one thousand four hundred pounds of terhydrated phosphoric acid diluted with two thousand eight hundred pounds of water, together with enough more of the phosphoric acid to fully neutralize and saturate all carbonates, oxides, or other substances contained in the mass under treatment that may be decomposed or rendered soluble by phosphoric acid.

After standing six or seven days with frequent agitation the action will have been completed, and we shall have a superphosphate of lime in solution which can be decanted or leached out, leaving, in case raw bone is used, the gelatine, which is valuable for further uses.

Then, for continuing the process, I take about two-thirds of the decanted or leached liquor to which I add a sufficient amount of sulphuric acid to deposit, in the form of sulphate of lime, all the lime in the solution, leaving a dilute phosphoric acid which can be decanted or leached for future use.

To the remaining one-third, placed in a suitable vessel, I add one of the alkaline sulphates, either soda, potassa, ammonia, or magnesia, in a sufficient amount to act on all the lime held in the solution, getting as a result all the lime deposited as a sulphate, which, for some purposes, may be left remaining, or, if desired, can readily be removed by leaching, or decanted, leaving a superphosphate of the base, the same in kind as the sulphate selected and used, which compounds are severally or jointly capable of displacing carbonic acid from alkaline carbonates when in solution or at a high temperature, while they may be mixed, after being properly prepared, with dry alkaline carbonates at ordinary temperatures, and preserved in that state unchanged for an indefinite length of time.

The above liquor is concentrated in suitable vessels or evaporators to a thick paste, then allowed to cool, then mixed with flour, starch, or other farinaceous substance, allowed to dry, then coarsely broken up and thoroughly dried at a temperature not exceeding 150° Fahrenheit, when it is ground for use.

The proportions of flour, starch, or other substances may be varied considerably, but I have found that a convenient proportion is such that, when thoroughly mixed, seventeen parts of the compound will neutralize seven parts of bicarbonate of soda.

I do not claim pulverulent acid phosphates nor powders made therefrom for baking and like purposes, as such are known and claimed in the patent of E. N. Horseford, dated April 22, 1856. My invention is an improved mode of producing acid phosphates, viz:

1. The process herein described for producing acid phosphates, the same consisting in the treatment of phosphates by means of phosphoric acid, substantially as described.

2. The mode of preparing the super-phosphate of soda, potassa, ammonia, and magnesia, substantially as described.

NATHANIEL B. RICE.

Witnesses:
EDWIN BURT,
H. C. DRIGGS.